United States Patent [19]

Bennett et al.

[11] Patent Number: 4,754,810
[45] Date of Patent: Jul. 5, 1988

[54] METHOD FOR PATCHING CASING LEAKS

[75] Inventors: Karl E. Bennett, Hockessin, Del.; Jeff J. Jurinak, Ponca City, Okla.; Chandra L. Mowery; Walter M. MacKinlay, both of Corpus Christi, Tex.; Larry D. Johansen, Carrizo Springs, Tex.

[73] Assignee: Conoco Inc., Ponca City, Okla.

[21] Appl. No.: 26,237

[22] Filed: Mar. 16, 1987

[51] Int. Cl.$^4$ .................. E21B 33/138; E21B 47/06; E21B 47/10

[52] U.S. Cl. .................. 166/253; 166/285; 166/277; 166/292; 166/295; 166/311; 166/312

[58] Field of Search .............. 166/285, 287, 277, 281, 166/292, 294, 295, 311, 312, 253, 250; 523/130

[56] References Cited

U.S. PATENT DOCUMENTS

| | | | |
|---|---|---|---|
| 2,294,294 | 8/1942 | Grebe | 166/295 |
| 2,308,072 | 1/1943 | Granger | 166/277 X |
| 2,308,425 | 1/1943 | Prince | 166/292 X |
| 2,368,424 | 1/1945 | Reistle, Jr. | 166/295 X |
| 2,832,414 | 4/1958 | Battle | 166/294 |
| 2,842,205 | 7/1958 | Allen et al. | 166/285 |
| 2,923,356 | 2/1960 | Glass et al. | 166/285 |
| 3,014,530 | 12/1961 | Harvey et al. | 166/295 X |
| 3,202,214 | 8/1965 | McLaughlin, Jr. | 166/292 |
| 3,306,870 | 2/1967 | Eilers et al. | 166/295 X |
| 3,502,149 | 3/1970 | Pence, Jr. | 166/294 X |
| 3,623,770 | 11/1971 | Ayres et al. | 166/292 X |
| 3,809,160 | 5/1974 | Routson | 166/294 |
| 3,912,012 | 10/1975 | Bush | 166/285 |
| 4,040,484 | 8/1977 | Hessert | 166/295 X |
| 4,386,806 | 6/1983 | Axen et al. | 166/295 X |
| 4,634,187 | 1/1987 | Huff et al. | 166/281 X |
| 4,643,255 | 2/1987 | Sandiford et al. | 166/295 |
| 4,648,453 | 3/1987 | Nagra et al. | 166/281 |

Primary Examiner—George A. Suchfield

[57] ABSTRACT

A process for sealing casing leaks comprises cleaning out the annulus between the tubing and the casing, situating a gelable mixture in the annulus at the loci of the leak in the casing, pressuring the mixture through the leak into the formation and effecting gelation of the mixture. Optionally, the remaining gelable mixture may be circulated out of the annulus. Gelable mixtures can be comprised of various organic and inorganic gel polymers.

2 Claims, 1 Drawing Sheet

METHOD FOR PATCHING CASING LEAKS

This invention relates to the art of subterranean hydrocarbon recovery and, more particularly, to a process for repairing leaks in casings of hydrocarbon wells.

BACKGROUND OF THE INVENTION

Corrosion-induced casing leaks are a pervasive problem in many oil fields. While such leaks are a nuisance in production wells, they pose an economic and legal problem in injection wells. From a regulatory standpoint, the principal issue is the potential hazard of contamination of potable water supplies by leaking injection wells. For instance, the Texas Railroad Commission requires that active injection wells pass a casing integrity test. The test is conducted by filling the annulus between the well casing and tubing with water, pressurizing the system to at least 500 psi and monitoring the casing surface pressure for a 30 minute interval. If, during this time period, the casing pressure declines by more than 25 psi, the well fails the test. Only a very small fissure in a well casing is required to cause a well to fail this standard.

It is currently common practice in the oil industry to attempt to plug such casing leaks by a process called a "cement squeeze." In this process, a cement slurry is pumped into an isolated section of the well bore casing and pressurized to displace the cementitious material through the leaks to a position behind the casing. Well tubing and packers are retrieved prior to cement setting. Upon setting of the cement, a plug in the wellbore is created which must be drilled out and the tubing rerun in the hole.

SUMMARY OF THE INVENTION

The present invention provides means of plugging casing leaks with an aqueous polymer gel solution. Both very small and very large casing leaks can be plugged, and the plugging material can be easily removed from the casing.

In accordance with the invention, a leak in a well bore annulus is plugged by a process comprising the steps of filling the annulus with a solution of a water soluble, gelable polymer, pressuring said solution of gelable polymer within the annulus to displace a portion thereof through the casing leaks to a position behind the casing and causing the gelable polymer solution to form a stable low permeability, high strength gel.

Further in accordance with the invention, the above-noted process further includes the step of circulating any residual gelable polymer solution out of the well bore annulus subsequent to the step of pressuring and prior to the step of gellation.

It is therefore an object of this invention to provide a casing plugging material which can be displaced through very small as well as very large casing leaks to form a stable plug of those leaks.

It is a further object of this invention to provide a casing plugging material which may be easily circulated out of the well bore after use.

BRIEF DESCRIPTION OF THE DRAWINGS

These and other objects of the invention will become more apparent through consideration of a more detailed explanation of the invention to be described hereinafter in conjunction with the accompanying drawings forming a part of this specification and in which.

DETAILED DESCRIPTION OF PREFERRED EMBODIMENTS AND THE DRAWINGS

Figure 1:
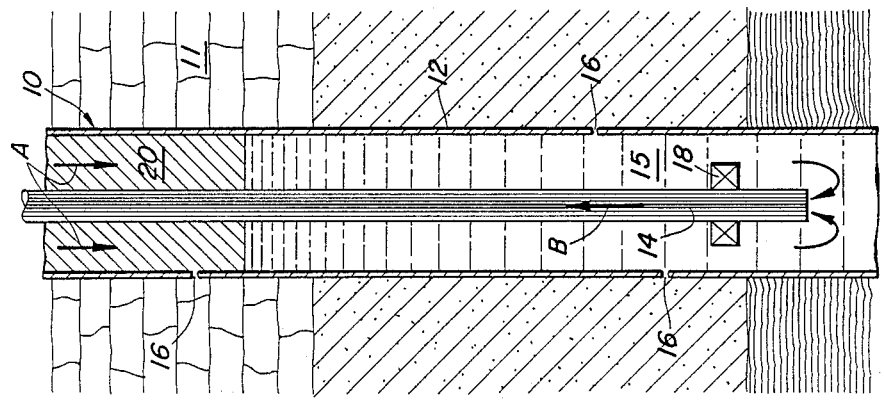

Referring now to the drawings wherein the showings are for the purposes of illustrating a preferred embodiment of the invention only and not for the purpose of limiting same, FIG. 1 shows a well 10 having an outer tubular casing 12 in a substantially concentric inner production/injection tubing 14. The casing 12 and the tubing 14 define a wellbore annulus 15 which, in a static condition, is filled with a well bore fluid such as brine. The casing 12 has a plurality of leak openings 16 which communicate to the surrounding earth strata 11. If left open, the leaks would allow the well bore fluid to penetrate the earth strata 11 with a possible result of ground water contamination, etc.

Figure 2:
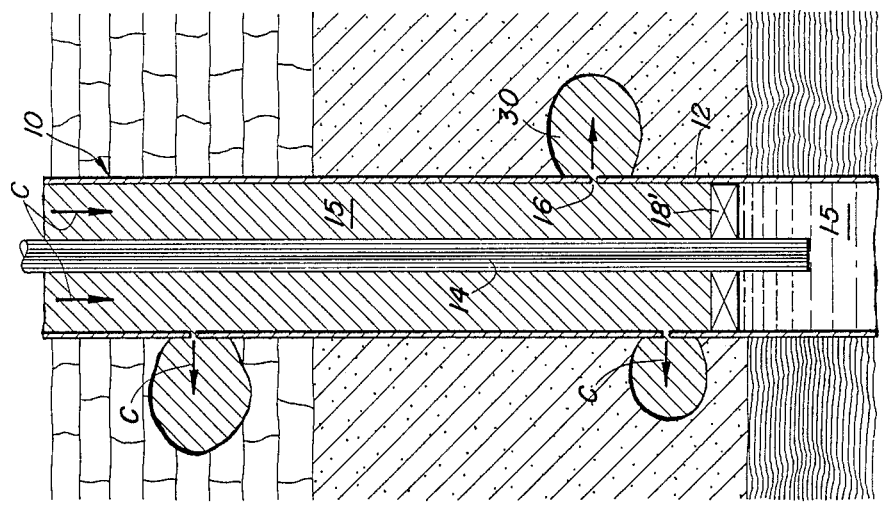

In accordance with the invention, the leak openings 16 in the casing 12 are plugged by injecting a gel solution 20 in the direction of arrows A into the wellbore annulus 15. The gel solution 20 displaces the wellbore fluids through the tubing 14 in the direction of arrows B. Once the well bore annulus 15 is completely filled with the gel solution 20 at least to the point at or below the packer 18, the packer 18' is closed off (FIG. 2) to isolate the gel solution 20 in the well bore annulus 15 above the packer 18'. Injection pressure (arrows C) is then increased in the gel solution 20 to displace the gel solution 20 into the earth strata 11 behind the casing 12 through the leak openings 16. The gel solution 20 penetrates into the earth strata 11 to form plugging bodies 30. If desired, the gel solution 20 can, at this point, be permitted to form a gel in the well bore annulus and in the areas behind the casing 12 adjacent the leak openings 16 thereby plugging the leaks.

Figure 3:
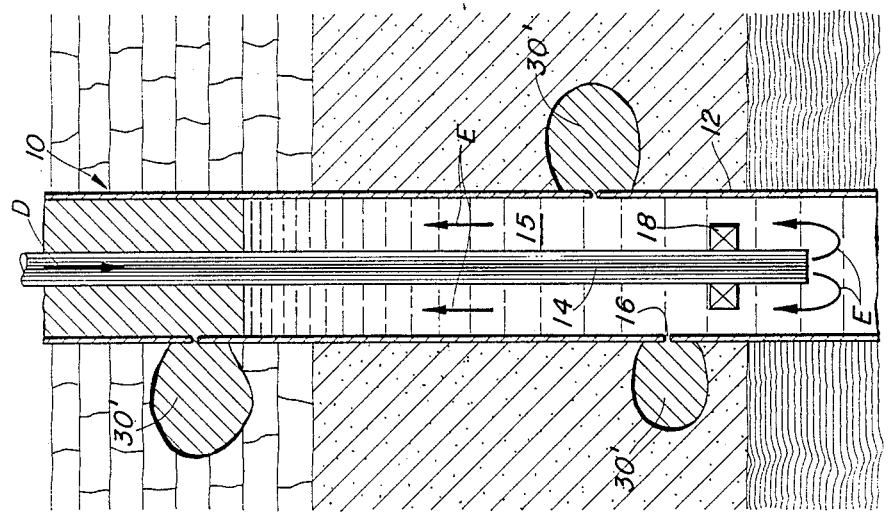
FIGS. 1, 2 and 3 schematically illustrate the steps of injection, displacement and removal, respectively, of the gelable polymer solution used for plugging casing leaks in accordance with the present invention.

In the alternative, it is possible to circulate the gel solution 20 which has not been displaced into the earth strata 11 out of the well bore annulus 15 by pumping water or other fluid through the tubing 14 (arrow D) and reverse displacing the remaining gel solution 20 upwardly out of the well bore annulus (arrows E) once the packer 18 has been returned to its open position (FIG. 3). This reverse circulation is initiated immediately following the displacement step shown in FIG. 2 and, preferably, prior to any substantial gellation of the gel solution 20. Upon gelation of the gelled plugs 30' (FIG. 3), the leak openings 16 in the casing 12 are plugged.

The preferred gel solution used in accordance with the invention may comprise an inorganic polymer gel such as an alkali metal silicate or an organic polymer gel such as polyvinylalcohol, polyacrylamide, polyacrylic acid or other polymer gel having the characteristics of being water soluble, having low permeability and high gel strength.

It is generally advantageous to have the casing clean and free of deposits or scale which might hinder the flow of polymer solution into the leak openings or possibly result in a chemical interaction with the gel solution. Similarly, it may be desirable to reduce the possibility of adverse chemical interaction between the formation and the treatment solution. It is therefore preferred that some type of precleaning step be performed to the well prior to the injection of the gel solution such as running a casing scraper, circulating acid to clean up deposits and open occluded leaks, perforating the casing in damaged zones to allow easy treatment placement behind the casing, pumping a preflush solution into the leak to precondition the formation matrix behind the pipe or any combination of these processes or other similar processes.

The following example will serve to illustrate the use of the present invention in plugging casing leaks in a South Texas injection well. Such example is presented for the purposes of illustrating the invention only and should not be considered as a limitation upon the applicability of the process as described above.

EXAMPLE

Pressure testing of the South Texas well indicated that casing leaks were resulting in a casing pressure decline of between 110 and 230 psi during the 30 minute Texas Railroad Commission standard test. The damaged zone was found to be between 1,161 feet and 1,176 feet. A packer was located at 1,239 feet and the well bore annulus having a volume of 13.3 barrels was flushed utilizing a weak brine solution to preclean the casing prior to injection of the gel solution. A silica gel solution comprising 10% silica in a fresh water solution was neutralized with hydrochloric acid to a pH of about 7.5. This gel solution was then pumped into the well bore annulus to a point at or below the packer and the packer was closed off. The gel solution in the annulus was then pressurized to about 675 psi and the pressure held by injection of additional gel solution for a period of about seven (7) hours. The packer was then released and the gel solution remaining in the annulus was backflushed out of the well utilizing a weak brine solution. A week later, the standarized casing pressure test was again performed and showed casing leakage of about 10 psi for the 30 minute test, well within the acceptable limits for such test.

While the invention has been described in the more limited aspects of a preferred embodiment thereof, other embodiments have been suggested and still others will occur to those skilled in the art upon a reading and understanding of the foregoing specification. It is intended that all such embodiments be included within the scope of this invention as limited only by the apended claims.

Having thus described our invention, we claim:
1. A process for detecting and patching leaks in the casing of a wellbore, said wellbore containing wellbore fluid and having therein a substantially concentric tubing, said tubing having a packer located below said leaks, said process comprising the steps of:
   (a) applying pressure to fluid in the annulus between said casing and tubing above said packer, and determining that said pressure over a time interval drops to an unacceptable level indicative of casing leaks;
   (b) injecting a gelable solution into the annulus between said casing and said tubing to displace wellbore fluid from said annulus and up said tubing until said annulus is filled with said gelable solution at least to the point at or below said packer;
   (c) closing said packer to isolate said gelable solution in said annulus above said packer;
   (d) applying pressure to said gelable solution to displace gelable solution through said leaks into earth strata outside said casing adjacent said leaks;
   (e) causing said gelable solution to form plugging bodies in said earth strata adjacent said leaks; and
   (f) after said plugging bodies are formed, pressurizing said wellbore again and closing in said wellbore to verify that said leaks have been plugged.
2. The process of claim 1 wherein, prior to formation of said plugging bodies, said packer is opened and fluid is pumped down said tubing to displace gelable solution from said annulus.

* * * * *